(12) United States Patent
Wan et al.

(10) Patent No.: US 12,167,215 B1
(45) Date of Patent: Dec. 10, 2024

(54) SYSTEM OF PAIRING AND SYNCHRONIZING LOUDSPEAKER, LIGHTING, AND OTHER SYSTEMS

(71) Applicant: SOUTHERN AUDIO SERVICES, INC., Baton Rouge, LA (US)

(72) Inventors: Fang Wan, Dalang (CN); Jeff B. Jordan, Baton Rouge, LA (US); Jon C. Jordan, Baton Rouge, LA (US)

(73) Assignee: SOUTHERN AUDIO SERVICES, INC.

( * ) Notice: Subject to any disclaimer, the term of this patent is extended or adjusted under 35 U.S.C. 154(b) by 182 days.

(21) Appl. No.: 17/950,260

(22) Filed: Sep. 22, 2022

Related U.S. Application Data

(60) Provisional application No. 63/249,968, filed on Sep. 29, 2021.

(51) Int. Cl.
| | |
|---|---|
| *H04R 3/12* | (2006.01) |
| *G06F 3/16* | (2006.01) |
| *H04R 5/04* | (2006.01) |
| *H04W 56/00* | (2009.01) |

(52) U.S. Cl.
CPC ............... *H04R 3/12* (2013.01); *G06F 3/165* (2013.01); *H04R 5/04* (2013.01); *H04W 56/0015* (2013.01); *H04R 2420/05* (2013.01); *H04R 2420/07* (2013.01)

(58) Field of Classification Search
CPC ........ H04R 3/12; H04R 5/04; H04R 2420/05; H04R 2420/07; H04W 56/0015; G06F 3/165
See application file for complete search history.

(56) References Cited

U.S. PATENT DOCUMENTS

| | | | | |
|---|---|---|---|---|
| 9,913,011 | B1 * | 3/2018 | Giuliani | H04R 1/00 |
| 2016/0150320 | A1 * | 5/2016 | Hetke | H04R 3/12 |
| | | | | 381/80 |
| 2021/0176561 | A1 * | 6/2021 | Li | H04R 27/00 |
| 2022/0369113 | A1 * | 11/2022 | Motos | H04L 9/001 |

FOREIGN PATENT DOCUMENTS

| | | | |
|---|---|---|---|
| CN | 109754798 B | * | 10/2021 |
| CN | 113825105 B | * | 3/2023 |

\* cited by examiner

*Primary Examiner* — David L Ton
(74) *Attorney, Agent, or Firm* — ROY KIESEL FORD DOODY & NORTH, APLC

(57) ABSTRACT

A method for pairing and controlling multiple loudspeaker systems within a network. The network includes multiple control units, each having Bluetooth and RF chipsets, an MCU, and at least one transceiver. One control unit, the master unit, is operatively connected to a first loudspeaker system. A second control unit, the slave unit, is operatively connected to a second loudspeaker system. The master unit generates and records an IV key. The IV key and master unit identifying information are transmitted to, and recorded by, the slave unit. The IV key is then used to initiate communication between the master and slave units. Slave unit identifying information is transmitted to, and recorded by, the master unit. The master unit then transmits digital data to the slave unit, which relays the data to the second loudspeaker system. The first and second loudspeaker systems then simultaneously perform a task associated with the digital data.

12 Claims, 3 Drawing Sheets

SYSTEM OF PAIRING AND SYNCHRONIZING LOUDSPEAKER, LIGHTING, AND OTHER SYSTEMS

PRIORITY CLAIM

This application claims priority to U.S. Provisional Application No. 63/249,968 filed on Sep. 29, 2021, which is hereby incorporated by reference in its entirety.

BACKGROUND OF THE INVENTION

Field of the Invention: The invention is related to loudspeakers and light systems in general and synchronized loudspeaker and light systems in particular.

Prior Art: Loudspeaker systems in which multiple speakers play synchronously are known. Sound systems in which light displays are synchronized and synchronized to music are known. However, these are commonly stadium, theater, or club level systems, with hard wired connections between the various speakers and lights. These systems can be contrasted with ad hoc systems that may be created when several vehicles or watercraft come together for impromptu gatherings. These vehicles and watercraft often have sound systems and lights, typically LED's. However, they are not connected to one another. They are often made by different manufacturers, are of varying ages, and almost invariably, have different owners. The system will only exist while the vehicles and/or watercraft are in proximity to one another. It is generally possible to get the music systems to play synchronously by tuning them all to the same broadcast radio station. However, synchronized play becomes difficult to impossible for non-general broadcast input. For example, consider one person with a play list on a mobile device. He can play it on his sound system, but getting it to play on all of the sound systems synchronously is problematic. Another example would be input via satellite radio, such as a sporting event. If one of the attendees at an informal group gathering is listening to a sporting event, it may be desirable to play the game broadcast on other speakers in the gathering. This would avoid having to play the game at elevated volume on the system of the first attendee so that those not in his boat or vehicle could hear. Coordinating synchronous play on multiple unconnected speakers is generally not feasible. Similarly, many water craft and recreational vehicles have lighting systems which may be configured to flash in time to music being played on the sound system of the vehicle or water craft. Getting the lighting systems of independent vehicles and water craft to flash synchronously is not feasible. Accordingly, a loudspeaker and lighting system meeting the following objectives is desired.

OBJECTS OF THE INVENTION

It is an object of the invention to allow loudspeaker systems to wirelessly connect to each other.

It is a further object of the invention to allow a master loudspeaker system to control what is played on one or more slave loudspeaker systems to which it is connected wirelessly.

It is a still further object of the invention to allow a master loudspeaker system to control the volume of one or more slave loudspeaker systems to which it is connected wirelessly.

It is yet a further object of the invention to allow a master loudspeaker system and one or more slave loudspeaker systems to play synchronously.

It is a still further object of the invention to allow a slave loudspeaker system to easily disconnect from the master loudspeaker system to resume independent play.

It is yet a further object of the invention to allow a former slave loudspeaker system to easily reconnect to the master loudspeaker system to resume synchronous play.

It is a still further object of the invention to allow a slave loudspeaker system to easily convert to a master loudspeaker system.

It is yet a further object of the invention to allow a master loudspeaker system to easily convert to a slave loudspeaker system.

It is a still further object of the invention to allow lighting systems to wirelessly connect to each other.

It is yet a further object of the invention to allow a master lighting system and one or more slave lighting systems to flash and vary in intensity and color synchronously.

It is a still further object of the invention to allow a slave lighting system to easily disconnect from the master lighting system to resume independent display.

It is yet a further object of the invention to allow a former slave lighting system to easily reconnect to the master lighting system to resume synchronous display.

It is a still further object of the invention to allow a slave lighting system to easily convert to a master lighting system.

It is yet a further object of the invention to allow a master lighting system to easily convert to a slave lighting system.

It is a still further object of the invention to allow a lighting system to flash and vary in intensity and color in synchrony with accompanying music.

SUMMARY OF THE INVENTION

A system for pairing and controlling multiple loudspeaker systems is disclosed. Each loudspeaker system will include at least one loudspeaker. Each system will further comprise a control unit, though it will be appreciated that a control unit need not have a dedicated, associated loudspeaker. In the preferred embodiment, the control unit includes a Bluetooth™ chipset, a radio frequency (RF) chipset, a microcontroller unit (MCU), and one or more transceivers, which transceiver(s) may include an antenna. The control units have a master mode, a slave mode, and an independent mode. When a proximate control unit enters the master mode, the Bluetooth chipset will generate an Initialization Vector (IV) key. This IV key is recorded by the control unit and broadcast to any remote system trying to pair with proximate control unit. The remote system(s) will record the IV key and respond with information sufficient to identify the remote system to the master. The master will record the identity of the remote systems. Likewise, the remote system(s) will record the identity of the master. Both units having the IV key allows the master and the slave to share and decode encrypted Bluetooth data. Music and other digital sound input will be broadcast by the control unit, preferably in Bluetooth Classic format. However, most of the rest of the commands and exchange of information between the control unit and the slave system(s) will be shared via the RF chipset at 2.4 Ghz, with the exception of the initial broadcast of the IV key. Bluetooth is very good at transmitting music, but the use of Bluetooth protocols is not necessary for most of the rest of the information exchanged in the system. Eliminating the use of Bluetooth where it is not needed enhances the operability of the system.

A remote system that is paired to the master control may exit the system, returning to independent operation for a time. If the user of the remote system wishes to rejoin the master control as a slave, the user need only return his system to slave mode, assuming it is within range of the master. The remote system will scan for systems broadcasting in Bluetooth that it recognizes—that is broadcasts of Bluetooth signals coming from a master with which the remote system has previously paired. If the remote system recognizes a former master, it will send a signal to the master control system identifying itself and asking for the current IV key. If the master control recognizes the remote system, it will send the IV key. All of this is done via RF without interrupting the Bluetooth broadcast. It need not even involve the user of the master control. Once the remote unit has the current IV key, it can re-pair to the master and receive and decode the Bluetooth audio signal being broadcast. Other control information, such as instructions to dim, brighten, flash, or change colors of lighting associated with the speakers may also be transmitted by the master control to the slave system(s), ensuring that any lighting displays are synchronized across the system. Such lighting displays may be further synchronized to the music being played on the loudspeakers. A portable computer, such as a smart phone or tablet, may be provided. The portable computer will pair with the control unit, preferably by Bluetooth. The portable computer may then control the control unit. Alternatively, one or more control buttons may be provided on the housing of the control unit or, when a control unit is incorporated in the housing of a loudspeaker, on the housing of the loudspeaker.

DISCLOSURE OF THE BEST MODE

Figure 1:
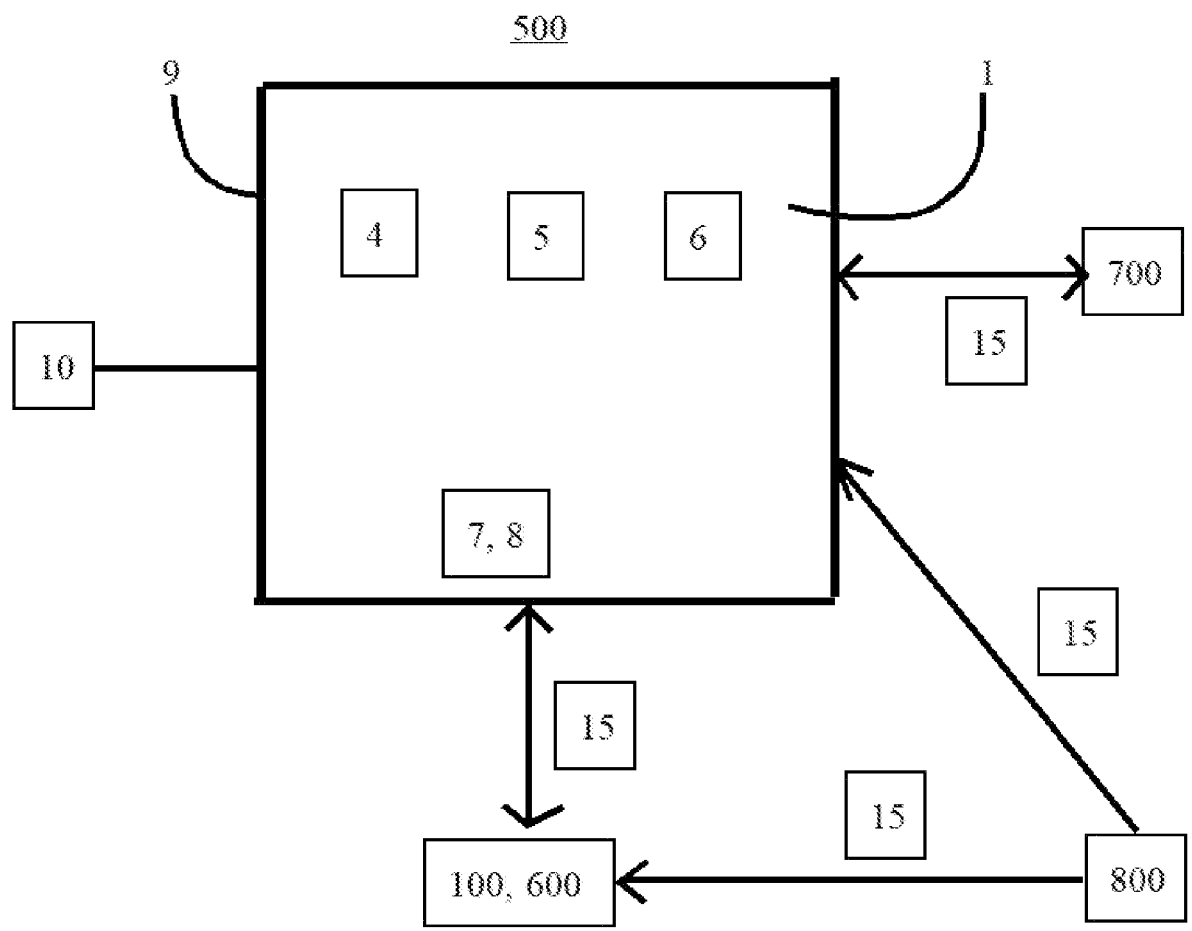
FIG. 1 is a schematic view of a control unit in independent mode with an external power source, a loudspeaker/lighting system with a remote control, and a portable computer.
Figure 2:
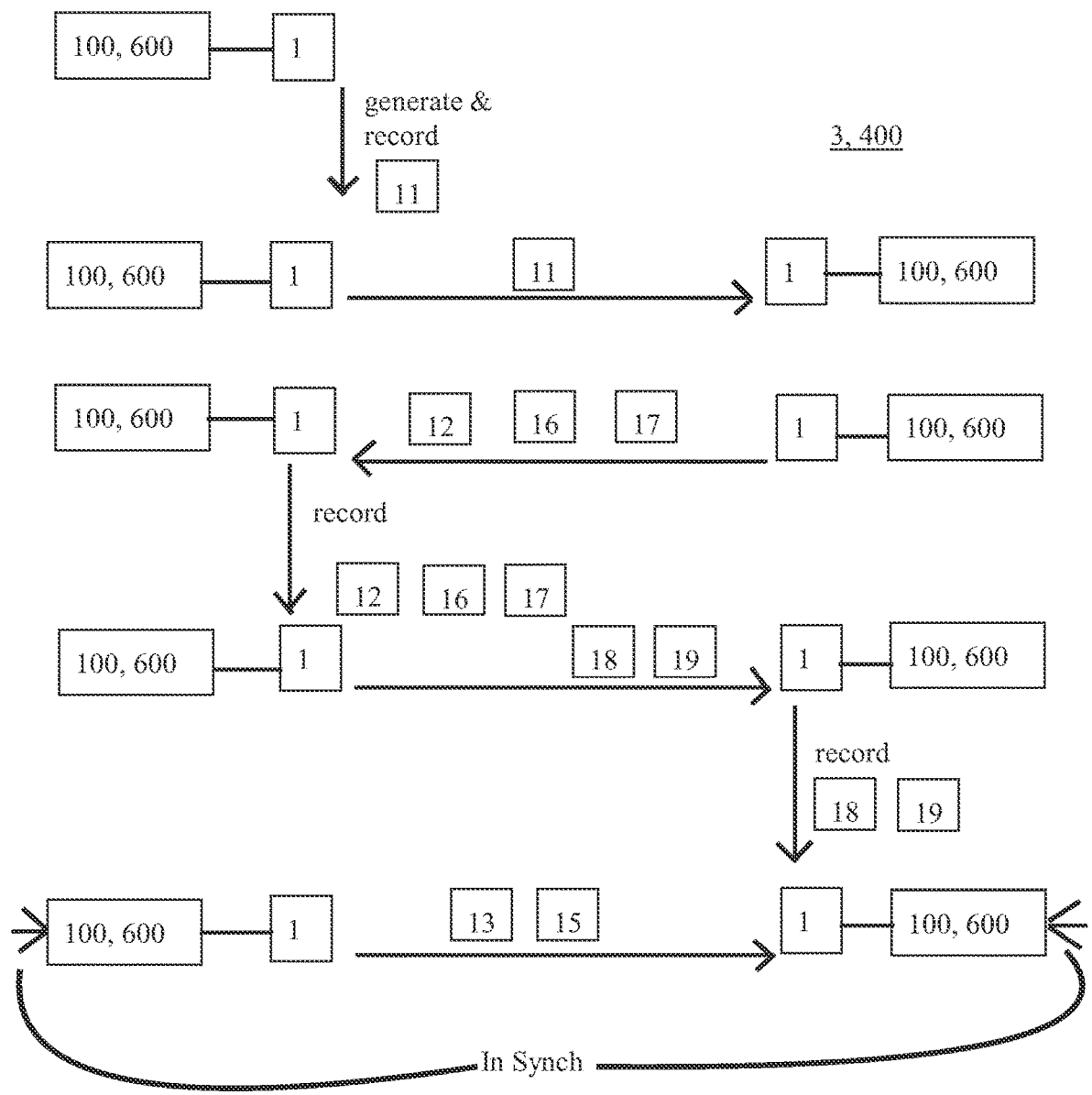
FIG. 2 is a flow chart illustrating a preferred embodiment of the pairing process between a control unit in master mode and a second control unit in slave mode.
Figure 3:
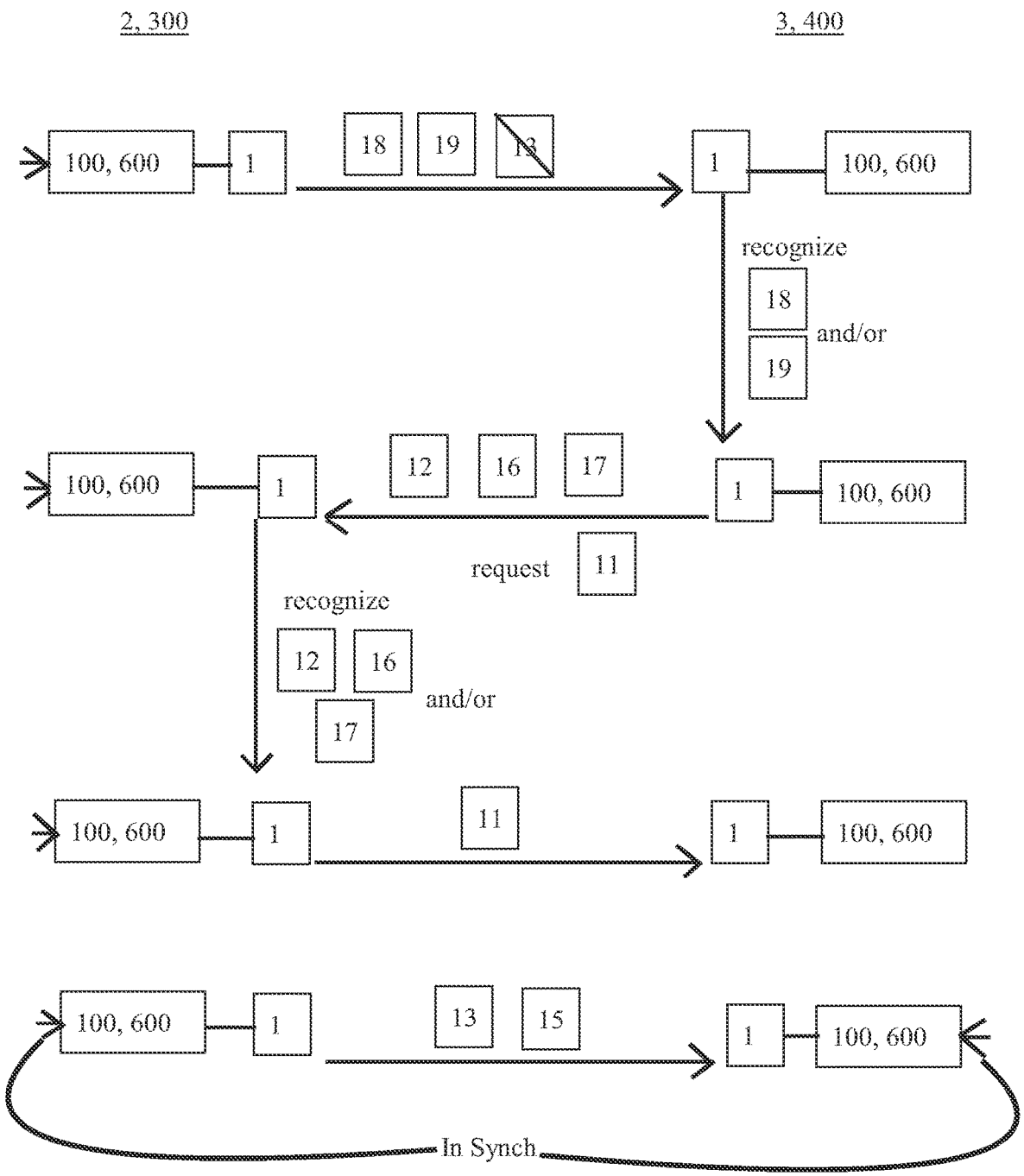
FIG. 3 is a flow chart illustrating a preferred embodiment of a re-pairing process between a control unit in master mode and a second control unit in slave mode.

A control unit 1 for a loudspeaker system is disclosed. Control unit 1 has three basic modes, a master mode 300, a slave mode 400 and an independent mode 500. In master mode 300, control unit 1 is capable of controlling a proximate loudspeaker system 2 and linking wirelessly with one or more remote loudspeaker system(s) 3. In slave mode 400, control unit 1 is capable of linking wirelessly to a remote loudspeaker system 3 and being controlled by the remote loudspeaker system 3. In independent mode 500, control unit 1 is capable of controlling a proximate loudspeaker system 2. In master mode 300 and slave mode 400, control unit 1 can convey digital input 15 to proximate loudspeaker system 2 and remote loudspeaker system(s) 3. In master mode 300 and slave mode 400, control unit 1 can also receive digital input 15 from remote loudspeaker system(s) 3.

Loudspeaker systems will include at least one loudspeaker. An exemplary loudspeaker is disclosed in U.S. Pat. No. 10,471,903, which is hereby incorporated by reference in its entirety.

In one embodiment, control unit 1 includes a Bluetooth™ chipset 4, a radio frequency (RF) chipset 5, a microcontroller unit (MCU) 6, and an antenna 7. It will be appreciated that antenna 7 will generally enhance the operation of a transceiver 8, discussed below, and may be incorporated into transceiver 8 or omitted altogether in some embodiments.

Bluetooth chipset 4 should preferably be capable of operating in Classic Bluetooth and Bluetooth Low Energy (LE) formats, formats which will be familiar to those of skill in the art. Bluetooth chipset 4 should preferably be capable of broadcasting and receiving at 150 megabits per second (Mbps) and ideally receiving at higher rates.

RF chipset 5 will preferably operate at 2.4 gigahertz (Ghz). At least one transducer and receiver will be provided, though they may be provided in the form of a transceiver 8, which is a combination transducer and receiver. The term "transceiver" will be used herein to refer collectively to transducers, receivers, and transceivers. Transceiver 8 may be provided as a stand-alone component of control unit 1, in Bluetooth chipset 4, in RF chipset 5, in MCU 6, or multiple transceivers 8 may be provided, with one transceiver in one, some, or all of components 4, 5, and 6. A power amplifier is preferably provided to boost the output of transceiver 8. A suitable power amplifier includes the RFX2401C available from RF Axis, Inc. of Irvine, California.

Control unit 1 components-Bluetooth chipset 4, RF chipset 5, MCU 6, optionally antennae 7, and one or more transceiver 8—are contained in a housing 9 which will be provided with a power source 10, which may be internal or external to control unit 1. Power source 10 will be selected to power chipsets 4 and 5, MCU 6, and transceiver(s) 8.

The foregoing components may be used to pair numerous slave systems to a single master unit. Describing now a system comprised of a proximate loudspeaker system 2 and one remote loudspeaker system 3, each loudspeaker system 2, 3 will comprise at least one loudspeaker 100 and a control unit 1 having the components described above. One of the control units 1 will assume the role of the master unit. However, as will be appreciated and explained in more detail below, either system 2,3 can perform the role of the master unit and that systems 2 and 3 may change roles whenever desired.

When proximate system 2 is to be the master unit, pairing will be initiated by directing the Bluetooth chipsets 4 to initiate pairing mode. The pairing protocol of the present invention will generally use the "Just Works" Bluetooth protocol, which protocol will be familiar to those of skill in the art.

Initiating pairing on the system that is to be the master will cause Bluetooth chipset 4 to generate an Initialization Vector (IV) key 11. IV key 11 is a unique, random number generated by the Bluetooth chipset 4. It plays an integral role in the Bluetooth decryption utilized in the invention. To use an overly simplified example to illustrate a function of IV key 11, consider a simple code in which the letters in the alphabet are shifted by a number of letters determined by the algorithm, X'=X+ (2Y), where X is the original letter, X' is the new "coded" letter and Y is the key. In this example, if Y=+2, the letter A would be represented as E and if Y=−4, A would be represented as S. In this example, Y represents IV Key 11. Both Bluetooth devices already "know" the algorithm. When Bluetooth chipset 4 of master/proximate device 2 generates the random IV key 11, it records the number in the Bluetooth chipset 4 and/or the MCU 6. Transceiver 8 will then broadcast IV key 11, preferably in Classic Bluetooth protocol. Transceiver 8 of the remote/slave system 3 will receive IV key 11 and transmit it to MCU 6 of the slave system 3. MCU 6 will save the IV key 11. Now both master system 2 and remote/slave system 3 know the algorithm and the key which will allow them to encrypt and decrypt Bluetooth data transmitted between the systems.

Transceiver 8 of the slave system 3 will then broadcast the media access control (MAC) identifier 16 of the Bluetooth chipset 4 of the slave system 3 and the name 12 of the slave Bluetooth chipset 4. Name 12 will typically be a user defined identifier of the owner of slave system 3—e.g., Jim's Radio or Mary's Stereo. Transceiver 8 of the slave system 3 will also broadcast a unique device identifier ("UDID") 17 of the MCU 6 of the slave system 3. These transmissions will typically be done via the RF chipset 5.

Transceiver 8 of the master system 2 will receive the MAC identifier 16 of the Bluetooth chipset 4 of the slave system 3 and UDID 17 of MCU 6 of the slave system 3. The MAC identifier 16 and name 12 of the Bluetooth chipset 4 of the slave system 3 will be transmitted to and recorded by the Bluetooth chipset 4 of the master system 2. The UDID 17 of the MCU 6 of the slave system 3 will be transmitted to the MCU 6 of the master system 2. The MCU 6 of the master system will create a list of slave devices comprising the UDID 17 of the MCU 6 of the slave system 3, and where there is more than one remote systems 3, the UDID's 17 of the MCU's 6 of the other slave systems 3.

It will be appreciated that at this point in the description, there are two lists being maintained by the master system 2:
   (A) MCU 6 on the master/proximate system 2 is maintaining a list of the MAC identifiers 16 and names 12 of the Bluetooth chipsets 4 on the remote/slave units 3. There will be one MAC identifier 16 and name 12 for each remote unit 3. In this example, where there is only one remote unit 3, there will be only one name 12 and MAC identifier 16 on the list.
   (B) MCU 6 on the master/proximate system 2 is also maintaining a list of the UDID's 17 of the MCU's 6 on the slave/remote systems 3. In this example, where there is only one remote unit 3, there will be only one UDID 17 on the list.

Where an "app" on a smart phone or other portable computing device is used to control the pairing, transceiver 8 of the master system 2 will transmit the information on the foregoing lists to the app, preferably via Bluetooth Low Energy (LE) protocol.

The transceiver 8 of the master system 2 will also transmit the name 18 of the Bluetooth chipset 4 of the master system 2 and its UDID 19 to the remote system(s) 3, together with a pairing success notification. MCU 6 of slave system 3 will record the name 18 and UDID 19 of the Bluetooth chipset 4 of master system 2 and terminate the pairing process. If an app on a smart phone or other portable computing device is being used to control the pairing, transceiver 8 will send the name 12 of Bluetooth chipset 4 of the master unit 2 to the app associated with slave system 3, again preferably via Bluetooth LE protocol.

The MCU 6 of remote/slave system 3 will maintain a list of the master systems 2 to which it has been paired.

With the systems paired, music or other sound input played on master system 2 will be transmitted via Classic Bluetooth protocol to the slave system(s) 3 and played there simultaneously. Examples of sound input 13 include, without limitation, a digital radio signal, digital musical files, output from a microphone, and combinations of the foregoing.

When a user of the remote/slave system 3 wishes to terminate the paired relationship with the master system 2, the user can switch the system from slave mode 400 to independent mode 500. This ends the paired relationship with the master system 2 and the remote system 3 returns to independent operation. Similarly, when a user of the master/proximate system 2 wishes end the master/slave pairing, the user can switch proximate system 2 from master mode 300 to independent mode 500. This will, likewise, end the paired relationship with any slave systems 3 and return proximate system 2 to independent operation.

If the operator of remote system 3 wishes to rejoin the paired relationship to master system 2, the systems do not have to go through the full pairing process again. Rather, an expedited rejoin process is provided. The operator of the remote system 3 switches from independent mode 500 to slave mode 400. This will prompt remote system 3 to scan for signals being broadcast in Bluetooth format, typically Bluetooth classic. Source identifying information is conveyed with the broadcast Bluetooth signal. If the remote system 3 recognizes the name 18 of a system to which it has been paired before—that is, if remote system 3 recognizes a broadcasting former master—the remote system 3 will attempt to pair with the broadcasting master system 2. The remote system 3 will send a signal to the recognized broadcasting master system 2 identifying itself by the MAC identifier 16 and name 12 of its Bluetooth chipsets 4 and/or the UDID 17 of its MCU 6. If the broadcasting master system 2 recognizes the remote system 3—that is, if the MAC identifier 16 and name 12 of the Bluetooth chipset 4 of remote system 3 and/or the UDID 17 of the MCU 6 of the remote system 3 are on the previously paired list of slave systems 3 maintained by master system 2—the master system 2 will transmit the current IV key 11 to remote system 3. All of the foregoing communication between the remote system 3 and the master system 2 preferably occurs between the RF chipsets 5 and may occur without input from the users of either system 2, 3.

Once the remote system 3 has the current IV key 11, the remote system 3 can re-pair with master system 2, allowing it to decrypt the Bluetooth audio signal being broadcast by master system 2.

The IV key 11 will be updated from time to time. It will typically be updated with a new IV key 11 each time master system 2 restarts, but IV key 11 may be updated more frequently. Each time master system 2 updates IV key 11, it will forward the new IV key 11 to remote/slave systems 3, preferably via the RF chipset 5. It will be appreciated that the master system 2 can exclude a slave system 3 from further pairing by (a) switching slave system 3 to independent mode 500; (b) deleting slave system 3's identifying information from the master system 2's list of previously approved slave systems 3; and (c) updating IV key 11. The excluded remote system 3 may attempt to re-pair with the master system 2. However, because the excluded remote system 3 is no longer on the master system 2's list of approved slaves, when the excluded remote unit 3 asks for the new IV key 11, the master unit 2 will ignore or deny the request. This will prevent excluded remote system 3 from re-pairing with master system 2 or from decrypting the Bluetooth signal being broadcast by the master system 2.

If it is desired that the roles of systems 2, 3 be switched, the foregoing processes may be reversed. Both systems 2, 3 would switch to independent mode 500, terminating pairing. Then the operator of remote system 3 will put his system into master mode 300 while the operator of proximate system 2 will switch his system into slave mode 400. From that point, exactly the same process described above would be repeated, except that remote system 3 will be the master and proximate system 2 will be the slave.

It will be appreciated that only three pairing commands are required in each system: enter master mode 300; enter slave mode 400; and enter independent mode 500. While there may be additional information and controls included in an app based or other controller, the simplicity of these three basic commands will allow the pairing to be controlled with a limited number of device mounted buttons. In fact, a single pairing control button may be provided on each system, such that each press of the button will switch the system from master mode 300 to slave mode 400 to independent mode 500 and back to master mode 300.

As alluded to above, the master system 2 may also have control of other features the remote/slave system 3. The master 2 may direct the slave system 3 to switch to independent mode 500. This will terminate the connection between master 2 and remote system 3. The master system 2 may control the volume of the slave system 3, including muting slave system 3. Where the slave system 3 includes lights 600, the master system 2 may control lights 600 of remote system 3. Where proximate system 2 and remote system 3 have lights 600 that include a plurality of LED lights, pairing system 2 and 3 together will allow the LED's to flash, change intensity, and change color in unison, such that the lights 600 of proximate system 2 and one or more remote systems 3 are flashing and changing in unison. There are known, commercially available systems that synchronize light displays with music, such as Vixen, available online at www.vixenlights.com, and Light-O-Rama, of South Glens Falls, New York (US) also available online at www.light-orama.com. By incorporating such software into control 1, music and lights being played and displayed on systems 2 and 3 may be synchronized.

In one embodiment, a smart phone, tablet, or other portable computing device (collectively portable computer 700) is used to control the system. In this instance portable computer 700 will include software, in the form of an app, that includes the controls for proximate system 2 and remote system 3. Portable computer 700 will most preferably link to proximate system 2 or remote system 3 via Bluetooth, most preferably Bluetooth LE. The basic commands will be shown on the app control screen: enter master mode 300; enter slave mode 400; and enter independent mode 500. Additionally, other common stereo controls may be included such as power, volume; pause; fast forward, skip song, bass and treble balance, and so forth. Additional commands may be included on the control screen that are particular to systems operating in master mode 300 such as mute all, mute all slaves, mute slave X, disconnect all slaves, and disconnect slave X. The app screen may also be configured to show the lists discussed above. For systems in master mode 300, this would be the list of the MAC identifiers and names of the Bluetooth chipsets 4 on the remote/slave units 3 and/or the list of the UDID's of the MCU's 6 on the slave/remote systems 3. In one embodiment, this list might only display names of the slaves to the user of the master system 2. The display may show all slave systems 3 that have ever been paired to the master system 2, all that are currently paired to the master system 2, or both-perhaps with a differentiation between systems currently paired vs. only previously paired. When the system is in slave mode 400, the list displayed may be the list of master systems 2 to which it has been paired, identifying the master system 2 to which it is currently paired. Alternatively, only the current master 2 may be displayed.

Many sound systems 2, 3 will come with remote controls 800 that have common stereo control commands, such as volume, pause, and so forth as listed above. When proximate system 2 is in master mode 300, operation of the basic stereo commands will be conveyed to the slave system(s) 3, preferably by the RF chipsets 5. Thus, turning the volume up or down on the master system 2 will effect a volume change on the slave system(s) 3. Similarly, using a remote to control the lights 600 of master system 2 will effect a corresponding change in lights 600 of slave system(s) 3.

Because music is broadcast to slave systems 3, there is no practical limit to the number of slave systems 3 that can pair to a master system 2. The only limitation is being able to physically position the slave system 3 within broadcast range of the master system 2. The preferred embodiment uses Bluetooth Classic to broadcast sound input to the slave systems 3. In the preferred embodiment, it will have a range of about 60 meters, though the effective range may be greater or less than 60 meters, depending on the environment. Wide open environments such as a lake or a sandbar may allow for a greater range.

The system has been described as comprising a master system 2 and one or more remote/slave systems 3, with the master 2 including at least one loudspeaker. However, it will be appreciated that all of the loudspeakers may be slaves. The master may include only control unit 1, which may not be directly connected to or otherwise associated with any particular loudspeaker. If control unit 1 is provided with a source of sound input, it could then broadcast the sound input to the slave systems 3, which may include all of the speakers in the system.

These and other improvements to loudspeaker pairing systems will be apparent to those of skill in the art from the foregoing disclosure and drawings and are intended to be encompassed by the scope and spirit of the following claims.

We claim:

1. A method for pairing and controlling multiple loudspeaker systems within a network of loudspeaker systems, wherein the network comprises a plurality of control units, each control unit comprising a Bluetooth chipset, a radio frequency ("RF") chipset, a microcontroller unit ("MCU"), and at least one transceiver, wherein one of said plurality of control units is operatively connected to a first loudspeaker system and wherein a second of said plurality of control units is operatively connected to a second loudspeaker system, wherein the method comprises:

generating an initialization vector ("IV") key with the control unit operatively connected to the first loudspeaker system;

recording the IV key in the control unit operatively connected to the first loudspeaker system;

transmitting the IV key to the control unit operatively connected to the second loudspeaker system;

transmitting information sufficient to identify the control unit operatively connected to the first loudspeaker system to the control unit operatively connected to the second loudspeaker system;

recording the IV key and the information sufficient to identify the control unit operatively connected to the first loudspeaker system in the control unit operatively connected to the second loudspeaker system;

using the IV key to initiate communication between the control unit operatively connected to the first loudspeaker system and the control unit operatively connected to the second loudspeaker system;

transmitting information sufficient to identify the control unit operatively connected to the second loudspeaker system to the control unit operatively connected to the first loudspeaker system;

recording the information sufficient to identify the control unit operatively connected to the second loudspeaker system in the control unit operatively connected to the first loudspeaker system;

transmitting digital data the from the control unit operatively connected to the first loudspeaker system to the first loudspeaker system and to the control unit operatively connected to the second loudspeaker system;

transmitting the digital data from the control unit operatively connected to the second loudspeaker system to the second loudspeaker system; and performing a task associated with the digital data on the first loudspeaker system and the second loudspeaker system simultaneously.

2. The method for pairing and controlling multiple loudspeaker systems within a network of loudspeaker systems according to claim 1 wherein the digital data comprises sound input.

3. The method for pairing and controlling multiple loudspeaker systems within a network of loudspeaker systems according to claim 2 wherein the digital data comprises digital radio signals, digital musical files, output from a microphone, and combinations of the foregoing.

4. The method for pairing and controlling multiple loudspeaker systems within a network of loudspeaker systems according to claim 1 wherein the task comprises playing music.

5. The method for pairing and controlling multiple loudspeaker systems within a network of loudspeaker systems according to claim 1 wherein the first loudspeaker system further comprises a first plurality of lights and wherein the second loudspeaker system further comprises a second plurality of lights.

6. The method for pairing and controlling multiple loudspeaker systems within a network of loudspeaker systems according to claim 5 wherein the digital data comprises instructions to the first plurality of lights and the second plurality of lights.

7. The method for pairing and controlling multiple loudspeaker systems within a network of loudspeaker systems according to claim 6 wherein the instructions comprises instructions to turn on, to turn off, to change intensity, to change color, and combinations of the foregoing.

8. The method for pairing and controlling multiple loudspeaker systems within a network of loudspeaker systems according to claim 6 wherein the first plurality of lights and the second plurality of lights each comprise LED lights.

9. The method for pairing and controlling multiple loudspeaker systems within a network of loudspeaker systems according to claim 5 wherein the task is selected from a group consisting of turning on the first and second plurality of lights, turning off the first and second plurality of lights, changing intensity of the first and second plurality of lights, changing color of the first and second plurality of lights, and combinations of the foregoing.

10. The method for pairing and controlling multiple loudspeaker systems within a network of loudspeaker systems according to claim 1 wherein the method further comprises discontinuing communication between the control unit operatively connected to the first loudspeaker system and the control unit operatively connected to the second loudspeaker system;

re-establishing communication between the control unit operatively connected to the first loudspeaker system and the control unit operatively connected to the second loudspeaker system, wherein the re-establishment of communication comprises:

scanning for digital data containing source identifying information being broadcast in the vicinity of the control unit operatively connected to the second loudspeaker system;

checking the source identifying information contained in the digital data against the information sufficient to identify the control unit operatively connected to the first loudspeaker system recorded in the control unit operatively connected to the second loudspeaker system;

transmitting information sufficient to identify the control unit operatively connected to the second loudspeaker system to the control unit operatively connected to the first loudspeaker system if the source identifying information in the detected broadcast matches the information sufficient to identify the control unit operatively connected to the first loudspeaker system recorded in the control unit operatively connected to the second loudspeaker system;

transmitting an updated IV key from the control unit operatively connected to the first loudspeaker system to the control unit operatively connected to the second loudspeaker system if the information sufficient to identify the control unit operatively connected to second loudspeaker system matches the information sufficient to identify the control unit operatively connected to the second loudspeaker system recorded in the control unit operatively connected to the first loudspeaker system.

11. The method for pairing and controlling multiple loudspeaker systems within a network of loudspeaker systems according to claim 1 wherein the network of loudspeaker systems comprises a plurality of loudspeakers dispersed across a plurality of vehicles in temporary proximity to one another.

12. The method for pairing and controlling multiple loudspeaker systems within a network of loudspeaker systems according to claim 11 wherein said plurality of vehicles are selected from the group consisting of watercraft, automobiles, all terrain vehicles, snowmobiles, motorcycles, and combinations thereof.

* * * * *